United States Patent [19]

Leroux et al.

[11] Patent Number: 5,500,255
[45] Date of Patent: Mar. 19, 1996

[54] REMOVAL OF HALOS FROM GLASS-CERAMIC ARTICLES DECORATED WITH A CERAMIC COLOR

[75] Inventors: Roland Leroux, Stadecken-Elsheim; Erich Rodek, Mainz; Kurt Schaupert, Hofheim-Wallau; Jürgen Thürk, Schornsheim; Waldemar Weinberg, Mainz, all of Germany

[73] Assignee: Schott Glaswerke, Mainz, Germany

[21] Appl. No.: 2,761

[22] Filed: Jan. 11, 1993

[30] Foreign Application Priority Data

Jan. 10, 1992 [DE] Germany .......................... 42 00 449.7

[51] Int. Cl.⁶ ...................................... B05D 3/06
[52] U.S. Cl. .................... 427/419.2; 427/419.4; 428/212
[58] Field of Search ..................... 428/426, 427, 428/428, 432, 446, 336, 689, 701, 203, 204, 210, 212; 427/419.2, 419.4

[56] References Cited

U.S. PATENT DOCUMENTS

| | | | |
|---|---|---|---|
| 3,346,410 | 10/1967 | McCarthy | 428/210 |
| 4,264,679 | 4/1981 | Panzarino | 428/427 |
| 4,273,826 | 6/1981 | McCollister | 428/210 |
| 4,781,970 | 11/1988 | Barbee | 428/210 |
| 5,137,779 | 8/1992 | Hinz | 428/428 |

FOREIGN PATENT DOCUMENTS

| | | |
|---|---|---|
| 0432653 | 6/1991 | European Pat. Off. . |
| 736411 | 5/1943 | Germany . |
| 742463 | 10/1943 | Germany . |
| 1912938 | 9/1970 | Germany . |
| 3936654 | 12/1990 | Germany . |

OTHER PUBLICATIONS

Chemical Abstracts, vol. 87, 1977, Columbus, Ohio, Abstract No. 121771g, p. 261.

Database WPIL, Week 10, Derwent Publications Ltd., London, Great Britain, AN 81-163320 (abstract of JP-A-55 167 191).

*Primary Examiner*—Archene Turner
*Assistant Examiner*—Timothy M. Speer
*Attorney, Agent, or Firm*—Millen, White, Zelano, & Branigan

[57] ABSTRACT

For removing halo formation, which often occurs on glass-ceramic articles decorated with a ceramic color, a layer of $SiO_2$ is applied to the glass-ceramic article after the glass-ceramic color has been burnt-in. The layer is preferably 40–200 nm thick. The layer can contain up to 66.5% by weight of oxides, which change the refractive index so that the layer is invisible, the layer being, for example, 85–93% by weight of $SiO_2$ and 7–15% by weight of $TiO_2$.

9 Claims, No Drawings

REMOVAL OF HALOS FROM GLASS-CERAMIC ARTICLES DECORATED WITH A CERAMIC COLOR

BACKGROUND OF THE INVENTION

This invention relates to glass-ceramic articles, especially glass-ceramic burner surfaces, decorated with a ceramic color and to a process for removing halos from glass-ceramic articles decorated with a ceramic color.

Glass-ceramic articles are widely used, for example, as kitchenware resistant to thermal shock and, especially, as cooking surfaces for stoves. These articles are, in general, provided with a decoration, either purely for reasons of appearance or, for example, to identify the hot cooking zones on the cooking surfaces. The colors used for the decorations are enamel-based ceramic colors applied by conventional techniques, such as, for example, burnt in (German Offenlegungsschrift 3,433,880; German Patent Specification 3,505,922; and German Patent Specification 3,600,109). As is known, glass-ceramics are produced from devitrifiable glass by heat treatment according to a defined temperature/time program (ceramization), temperatures of up to about 1100° C. being reached. For production-engineering reasons and for the purpose of saving energy, efforts are made to carry out the burning-in of the decorative colors simultaneously with the ceramization, even though the ceramization temperatures are unusually high compared with conventional burning-in temperatures (German Patent Specification 3,505,922).

Because of the high burning-in temperatures, numerous ceramic colors are unsuitable for decoration. With the remaining colors, halos often form in the shape of bleeding, blurred contours of the burnt-in decoration (hereafter called "halozation"). The resultant glass-ceramic articles cannot be used as high quality products and represent was or heavily discounted products.

German Patent 3,936,654 C1 has disclosed a process for producing a decorated glass-ceramic article, wherein the occurrence of halozation is avoided. This process comprises providing, before the decoration, an interlayer of $SiO_2$ on the surface of the glass-ceramic article which is to be decorated. The decoration is printed onto the interlayer and no longer shows any tendency to form a halo. Even though the formation of a halo can be reliably avoided by this process, it nevertheless still has some disadvantages. For example, all of the glass-ceramic articles to be decorated must, in fact, be coated with a layer of $SiO_2$ before decorating, even though the formation of a halo may occur only sporadically.

SUMMARY OF THE INVENTION

It is an object of the invention to provide a process in which it is no longer necessary to subject the entire production output to a pretreatment but wherein a treatment can be restricted to the articles in which halozation has actually occurred.

Another object is to provide the resultant products from the process

Upon further study of the specification and appended claims, further objects and advantages of this invention will become apparent to those skilled in the art.

DETAILED DESCRIPTION

To attain these objects, it has been found that a halozation, which occurs on decorated glass-ceramic articles, can be removed or reversed if the finished article, disfigured by the formation of a halo, is coated with a layer of $SiO_2$. Generally, the layer is applied in a thickness of 40–200 nm. At this thickness, the layer of $SiO_2$ does not impair the useful properties of the glass-ceramic article. If the layer thickness is less than 20 nm, the desired masking effect may fail to materialize in some cases; if a layer thickness of 200 nm is exceeded, spalling of the layer can occur. Layer thicknesses of between 60–80 nm are particularly suitable because they reverse the halozation to a sufficient extent.

Layers of pure $SiO_2$ are more or less readily visible, depending on the difference in the refractive index between the $SiO_2$ and the glass-ceramic substrate. This can be desirable to achieve particular optical effects. If, however, this effect is undesired and it is important that the layer of $SiO_2$ be invisible, it is possible to achieve invisibility by incorporating oxides into the layer of $SiO_2$, thereby changing the refractive index of the $SiO_2$ layer. Examples of suitable oxides which change the refractive index are $TiO_2$, $ZrO_2$, $SnO_2$, $MgO$, $Al_2O_3$, or mixtures thereof. These oxides are incorporated in such quantities into the layer of $SiO_2$ that the refractive index of the layer of $SiO_2$ corresponds to the desired value, i.e., it is sufficiently substantially equal to the refractive index of the glass-ceramic that the layer is invisible, the difference in the refractive indices of the layers preferably being less than 0.1±0.1, especially 0.03. The content of the oxides for changing the refractive index can be as high as 66.5% by weight relative to the total oxide content of the layer. Using conventional types of glass-ceramic, the addition of these oxides for changing the refractive index can be much lower, e.g., not higher than 50% by weight, especially not higher than 15% by weight. $TiO_2$ is particularly suitable as an oxide for changing the refractive index, and it is preferably present in the layer of $SiO_2$ in quantities of about 7–15% by weight, especially 11% by weight.

Wherever the layer of $SiO_2$ is mentioned in the following discussion, this always also includes a layer of $SiO_2$ containing oxides which change the refractive index. Also, in the context of this invention, the layer consists essentially of $SiO_2$, since the added oxides do not alter the halo-eliminating property of the $SiO_2$.

The layer of $SiO_2$ can be applied by any desired process, for example, by vapor deposition, sputtering, printing, or by a suitable chemical vapor deposition (CVD) process. However, the production of the $SiO_2$ layer by the sol-gel process is particularly advantageous. The sol-gel process has been described in detail, for example, in Lisa C. Klein, Sol-gel technology for thin films, fibres, preforms, electronics and specialty shapes, Noyes Publishers, 1988, Chapter Helmut Dislich, "Thin films from the sol-gel process," pages 50–79. In the sol-gel process, a thin layer of one or more silicic acid esters is applied to the surface of the article to be coated. In air, this layer hydrolyzes to form a gel which, after an optional step of drying and slight heating, is converted at temperatures of from 400°–650° C. into a solid layer of $SiO_2$.

The silicic acid esters are generally used in the form of a suitable solution, for example, in ethanol, the solution also containing in addition the metal oxides required for changing the refractive index in the form of alkoxides or other hydrolyzable compounds. Alcohols suitable for esterification and alkoxide formation and also as solvents are especially methanol, ethanol, n- and i-propanol and also butanol. As a solvent, ethanol is preferred because it is non-toxic, but all other solvents can also be used, provided that the aforesaid esters and/or alkoxides are soluble therein. The dilution of the esters by the solvent makes it easier to adjust the thickness of the layer to achieve the desired thickness of the ultimate layer of $SiO_2$. The suitable concentration of esters in the solvent can be readily determined by a few experiments and is, in general, between 1–30% by weight, calculated as the oxide. In addition to the esters, fractions of partially or wholly hydrolyzed esters in the sol form can also be present in the solvent without interfering with the process.

After the ultimate layer of $SiO_2$ is formed on the glass-ceramic article, the halo disappears, and a glass-ceramic article is thus obtained having sharply defined decoration and on which no halo is detectable.

A particular advantage obtainable by the invention is that glass-ceramic articles coated with a ceramic color, in which halozation has occurred, can be converted into high quality articles, resulting in an increase in productivity with a lower percentage of waste. The novel process also makes it possible to use a great variety of ceramic colors, including those which show an increased tendency towards halozation. There is, in general, also a positive influence on other important useful properties of the finished glass-ceramic, such as chemical resistance or wear resistance. In no case has deterioration in these properties been found.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius; and, unless otherwise indicated, all parts and percentages are by weight.

The entire disclosure of all applications, patents, and publications, cited above and below, and of corresponding German Application P 42 00 449.7, filed Jan. 10, 1992, are hereby incorporated by reference.

Example

In the following example, the invention is explained by reference to a layer of $SiO_2$ produced by the sol-gel process.

Example 1

A 4 mm thick disc of glass-ceramic was used of the composition (in percent by weight, based on oxides) of $SiO_2$, 64; $Al_2O_3$, 21.3; $LiO$, 3.5; $Na_2O$, 0.6; $K_2O$, 0.5; $BaO$, 2.5; $CaO$, 0.2; $MgO$, 0.1; $ZnO$, 1.5; $TiO_2$, 2.3; $ZrO_2$, 1.6; $MnO_2$, 0.65; $Fe_2O_3$, 0.23; $CoO$, 0.37; $NiO$, 0.06; and $Sb_2O_3$, 0.85. The glass-ceramic disc had been decorated by the screening process with a commercially available steel-blue ceramic color based on lead borate, Schott Product No. 7021. The decoration consisted of a point pattern in which each point had a diameter of about 1 mm. The contours of the individual points were not sharply defined but blurred due to halozation so that the resulting appearance was not aesthetically attractive.

The disc was immersed in a 2% by weight (calculated as a metal oxide) solution of 89% by weight of $SiO_2$ in the form of $SiO(OC_2H_5)_4$ and 11% by weight of $TiO_2$ in the form of $Ti(OC_2H_5)_4$ (for adjusting the refractive index) in ethanol. After emergence and dripping off, the disc was dried for 5 minutes at 50° C. and then burnt in for 15 minutes at 400° C.

After cooling of the disc, the applied decorative pattern showed a sharp contour. The other useful properties of the disc were good without any change. The thickness of the layer of $SiO_2/TiO_2$ was 65 nm.

We claim:

1. A process for removing halos in glass-ceramic articles decorated with a burnt-in ceramic color, comprising, after the glass-ceramic color has been burnt in, applying a layer consisting essentially of $SiO_2$ to the glass-ceramic article to remove the halo and to obtain a sharply defined burnt-in color.

2. A process according to claim 1, wherein a 40–200 nm thick layer of $SiO_2$ is applied.

3. A process according to claim 1, wherein into the layer of $SiO_2$ is incorporated not more than 66.5% by weight of at least one oxide which changes the refractive index of the layer so that the difference in the refractive index of the substrate and layer of $SiO_2$ is from 0 to less than 0.2.

4. A process according to claim 3, wherein a layer is applied in which is incorporated not more than 15% by weight of said at least one oxide.

5. A process according to claim 3, wherein the oxide which changes the refractive index of the layer is selected from the group consisting of $TiO_2$, $ZrO_2$, $SnO_2$, $Al_2O_3$, or $MgO$.

6. A process according to claim 1, wherein a layer of 85–93% by weight of $SiO_2$ and 7–15% by weight of $TiO_2$ is applied.

7. A process according to claim 2, wherein a layer of 85–93% by weight of $SiO_2$ and 7–15% by weight of $TiO_2$ is applied.

8. A process according to claim 1, wherein the layer of $SiO_2$ is applied by immersing the ceramic article having a burnt-in ceramic color in a solution of one or more silicic acid esters in the form of hydrolyzable alkoxides, a subsequent hydrolysis stage, a drying stage, and a burning-in stage.

9. A process according to claim 8, wherein the layer of $SiO_2$ is burnt-in at temperatures of from 400°–650° C.

* * * * *